Oct. 30, 1956 W. F. AMBLER 2,768,931
IN A LEAD SULFIDE SWEETENING PROCESS ADDING DISSOLVED
LEAD OXIDE TO MAINTAIN ACTIVITY OF LEAD SULFIDE
Filed July 19, 1954
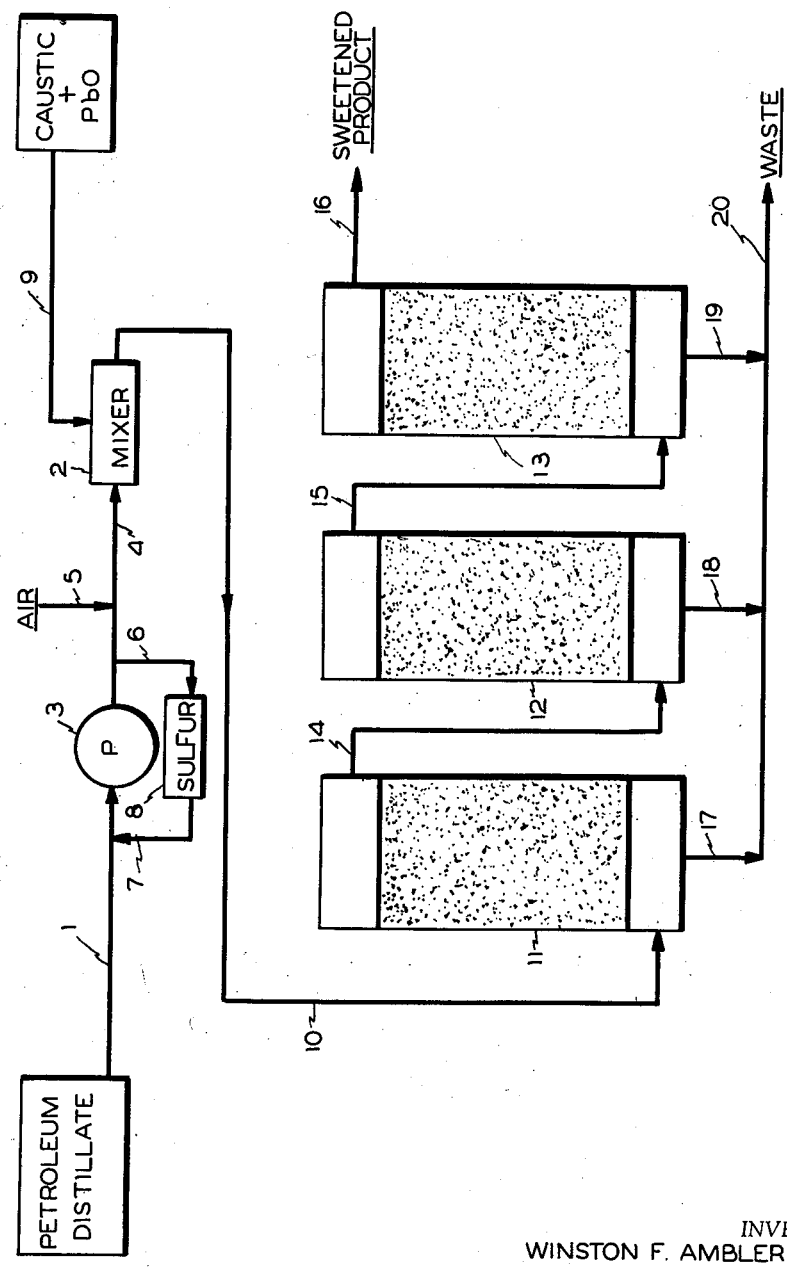
INVENTOR
WINSTON F. AMBLER
BY *Adams Forward & McLean*
ATTORNEY

United States Patent Office 2,768,931
Patented Oct. 30, 1956

2,768,931

IN A LEAD SULFIDE SWEETENING PROCESS ADDING DISSOLVED LEAD OXIDE TO MAINTAIN ACTIVITY OF LEAD SULFIDE

Winston F. Ambler, Hammond, Ind., assignor to Sinclair Refining Company, New York, N. Y., a corporation of Maine Application July 19, 1954, Serial No. 444,040

3 Claims. (Cl. 196—29)

This invention relates to the refining of petroleum distillates to remove undesirable sulfur compounds by a process known as sweetening. My improved sweetening process is applicable to petroleum distillates of high volatility or of low volatility boiling principally within the range from about 400 to 650° F. This invention is particularly concerned with the sweetening of light distillates such as gasoline and kerosene and with the sweetening of the more volatile of the furnace oils.

My invention relates to an improvement in the sweetening process generally known as the Bender lead sulfide sweetening process which is described in U. S. Patents Nos. Re. 22,135 and 2,376,223. In this method the oil to be sweetened after mixture with suitable reagents is passed through a catalyst bed comprising preformed lead sulfide supported on an inert carrier adapted to resist packing. Briefly, this process comprises incorporating in the distillate oil to be sweetened an amount of elemental sulfur not substantially exceeding the theoretical amount required to convert the mercaptan content of the oil to disulfides and an alkaline compound in an amount slightly in excess of that required to maintain the distillate in an alkaline condition. Also dispersed in the oil is a small amount of free oxygen or a gaseous mixture containing free oxygen such as air, and the resulting mixture is contacted with lead sulfide catalyst in the substantial absence of undispersed water and undispersed oxygen. The charge mixture to the Bender process as employed in the present invention also contains a small amount of dispersed water which may be added as steam but preferably is included by adding the caustic alkali as an aqueous solution. The distillate sweetened by the Bender process satisfactorily passes the conventional corrosion, doctor and sulfur tests. As employed in the present invention the Bender process utilizes a catalyst comprising lead sulfide held on a solid inert carrier by a binding agent. Generally, in preparing the catalyst the lead sulfide is deposited as lead oxide which is then converted to lead sulfide.

The Bender process as conventionally practiced is for the most part highly satisfactory. The process is effected continuously over fairly long periods of time; however, at periodic intervals it must be interrupted and the catalyst bed regenerated or reactivated. Aside from losing processing time during the regeneration, the latter operation itself involves considerable manipulation and expense. The spent catalyst may be reactivated by steaming the catalyst bed for several hours followed by washing with water until the catalyst is substantially free from water-soluble materials. Usually the solid catalyst particles must be removed from the processing vessels and retreated with litharge (PbO) and a binding agent during the reactivation operation due to the loss of lead values during processing through carry-out in the caustic discharge and carry-over in the caustic in the petroleum overhead.

In the present invention I have found that the lead values normally lost from the catalyst bed during operation of the Bender process can be supplied by addition of litharge to the charge stream containing the water, caustic, sulfur and oxygen. The litharge added apparently adheres to the solid contact particles of the bed either as lead oxide or in sulfide form while processing continues and even though additional binding agent is not added. Eventually the added lead values are changed to the active sulfide state and accomplish a rejuvenating effect on the catalyst bed in situ without requiring process shutdowns or catalyst removal from the treating vessel. By adding the litharge in the charge stream, processing time between reactivations can be extended and losses normally incurred in rejuvenating the catalyst bed are diminished.

The addition of litharge to the charge stream may be accomplished by simple mixing with the hydrocarbon feed stream which eventually contains the caustic, dispersed water, sulfur and dispersed oxygen. The litharge will dissolve in the aqueous caustic upon sufficient mixing. The separate ingredients can be added to the distillate in any order, however, I prefer that the litharge be added to an aqueous sodium hydroxide solution which is then added to the hydrocarbon stream thereby avoiding difficulties in getting the litharge into solution. Upon mixing the caustic solution containing the litharge, sulfur and oxygen an initial reaction ensues which converts the litharge to lead mercaptide and in part to lead sulfide. This reaction changes the added lead values to more active form by the time they are deposited in the catalyst bed and the added lead values can produce a more immediate catalytic effect without the delay incurred when litharge is placed on the solid catalyst particles to be converted to the catalytically active lead sulfide.

The amount of litharge added to the petroleum charge stream can be varied according to the desires of the operator. For instance, it may be controlled by the composition of the feed stock, the amount of sweetening to be effected, the extent of bed rejuvenation desired and other processing factors. Of course sufficient litharge is added to provide a noticeable or substantial addition of lead values to the catalyst bed to effect a rejuvenating action. Addition of substantial amounts of lead oxide over that which is soluble in the caustic of the charge stream is not desirable. Generally, I have found that 2 to 10 pounds of lead oxide per 6,000 barrels of petroleum distillate provide sufficient replacement of lead values of the catalyst in a multiple bed processing system. Where multiple beds and multiple caustic additions are employed separate parts of the required amount of litharge may be added in the caustic solutions added to the feed charged to the individual beds.

The conditions of treatment in the Bender sweetening process are generally known and are set forth in the beforementioned U. S. Patents Nos. Re. 22,135 and 2,376,223. In my process I employ the improved catalyst of Patent No. 2,376,223 which is also described in Reissue Patent No. 22,135 beginning at page 2, column 2, line 35. This lead sulfide catalyst contains from 50% to as high as 80% lead sulfide and does not pack in service over long periods of processing time even in the presence of a significant amount of moisture. The catalyst includes lead sulfide attached to the exterior surfaces of sized particles of a solid inert carrier of high strength and rigid structure. The particles are irregularly surfaced or shaped to present a large superficial area. The lead sulfide is attached to the surface of the carrier by a binder in such a way as not to mask the outer lead sulfide surfaces. This requires that the layer of binder be thin in order to leave exposed the outer sulfide surfaces. Examples of suitable carrier materials are blast furnace slag and Carborundum, preferably each crushed to produce ragged surfaces presenting a large superficial arrangement and sized to 6 to 20 mesh. Glass beads may be employed as the carrier material if they are first sand blasted or otherwise treated to increase the superficial area. The carrier material need not be of porous structure. It is only necessary that it be inert chemically and resistant to physical disintegration in the presence of moisture, alkaline materials and petroleum distillates, that it possess sufficient physical strength and rigidity to avoid crushing when incorporated in beds of substantial depth, that it be free from any substantial tendency to swell when exposed to moisture or to petroleum distillates, and that the outer surface of the particles be sufficiently irregular to present a large area. Although many binders may be used in preparing the catalyst, I have found particularly useful binders are the silicates of sodium with sodium metasilicate being preferred.

One method of preparing the lead sulfide catalyst is through the wetting of the surface of the carrier material with an aqueous solution of the binder and then coating the wetted carrier with litharge. There is no need to dry the catalysts but in some instances this step has been effected. The litharge is then converted to lead sulfide, for instance by contact with an alkaline solution of a petroleum distillate containing a substantial excess of elemental sulfur in accordance with known procedures. One catalyst of this type which can be employed is prepared from admixing 28% of blast furnace slag, 6 to 20 mesh, 58% litharge and 14% of an aqueous solution of sodium metasilicate having a specific gravity of 1.286.

In my operation of the Bender sweetening process the mercaptans are, in the presence of the lead sulfide catalyst, directly converted to disulfides either by the action of elemental sulfur or oxygen. The most advantageous extent to which a part of the sulfur requirement should be replaced by the provision of dispersed oxygen is governed by a number of known factors. In general, not more than about 30% of sulfur requirements can with advantage be replaced by the use of oxygen.

The alkalinity of the distillates subjected to the catalyst treatment should be controlled so that a slight excess is always available, that is, the sweetened distillate after treatment with the catalyst should be slightly alkaline. In general, the alkaline compound, e. g., sodium hydroxide or ammonia, is added in an amount to provide about 5 to 30 pounds per 1,000 barrels of petroleum distillate sweetened. About 5 to 7 pounds of sodium hydroxide per 1,000 barrels of gasoline is usually satisfactory in treating a moderately sour straight-run gasoline. In the treatment of reformed gasolines, about 15 to 20 pounds may be employed, while the amount of caustic employed is still further increased when treating very sour charges such as polymer gasolines. Both the specific amount of caustic employed in the strength of its aqueous solution is controlled in accordance with known procedures and processing factors.

The efficiency of the sweetening process is not appreciably affected by variations in temperature and pressure. Although the operation may be carried out at ordinary temperatures and pressures, I prefer to employ temperatures within the range of 120° to 150° F. and approximately atmospheric pressures. I also include a small amount of finely dispersed moisture in the distillate to be treated in order that the moisture may act as a washing agent to remove water-soluble salts from the catalyst bed. Preferably, at least a portion of this water is added by forming an aqueous caustic solution which is then added to the petroleum charge to supply at least a part of the required moisture content and caustic. The injection of steam into the charge stock affords another method of adding moisture. As noted in the mentioned patents an alternative method of dispersing alkaline, moisture and air to the distillate involves forcing an aqueous alkaline solution and air, with or without addition of moisture in the form of steam, through a line projecting into the distillate being charged which emits as a single jet, the components to be charged. Reference is made to the drawing which presents a simplified flow sheet diagram of the process of the present invention.

My invention will be described in further detail in the following specific examples which are not to be considered limiting:

*Example I*

Kerosene preheated to 140° F. and having a mercaptan sulfur content of 6 to 8 mg. per 100 ccs. was charged to line 1 at a rate of 250 barrels per hour. The charged petroleum distillate was passed to mixer 2 through pump 3 and line 4. Air was continuously passed by way of line 5 into the kerosene at the rate of 0.7 cubic feet per barrel of feed. The air was at ambient temperature and approximately atmospheric pressure. A sulfur slurry was added to the kerosene at the suction side of pump 3 through line 7 in an amount to provide 25 pounds per 1,000 barrels of kerosene charge. The sulfur slurry was formed by withdrawing kerosene from line 4 through line 6 to sulfur storage vessel 8 and the resulting slurry was metered as noted through line 7 to the kerosene charge. A 21° Bé aqueous caustic solution containing 5 pounds of litharge per barrel of solution was fed by a line 9 at the rate of 1 barrel per day to mixer 2. In mixer 2 the kerosene, air, sulfur and the caustic solution containing litharge were thoroughly mixed and then charged by line 10 to treating towers 11, 12 and 13. These towers were 3'6" in diameter and 12' high and contained 8' of catalyst bed. The catalyst in the bed was composed of lead sulfide bound with sodium metasilicate on blast furnace slag. The catalyst was prepared by impregnating ¼" porous blast furnace slag with litharge. The slag was first wetted with an aqueous solution of sodium metasilicate (5 pounds of sodium metasilicate per gallon) which served as a binding agent. Approximately 40 pounds of litharge per cubic foot of slag were then added and the resulting material was mixed in a concrete mixer. The impregnated slag was then charged to the treating towers and converted to the sulfide form by contact with kerosene containing excess elemental sulfur. The towers 11, 12 and 13 were connected for serial flow. The charge from line 10 passed to the bottom of tower 11, out of the top of tower 11 and into the bottom of tower 12 by line 14, and out of the top of tower 12 and into the bottom of tower 13 by line 15. Kerosene was withdrawn from the top of tower 13 by line 16 and passed to an earth treatment. Caustic was withdrawn from towers 11, 12 and 13 by lines 17, 18, 19 and 20 and passed to sewer. The kerosene product exhibited a good butyl mercaptan corrosion test.

*Example II*

The process of Example I was repeated except that No. 1 furnace oil (6 to 8 mgs. of mercaptan sulfur per 100 ccs.) was used as the petroleum distillate instead of kerosene. The furnace oil had an end boiling point of about 550° F. The treating agents, their amounts and the procedure employed in Example I were used in Example II except that the amount of sulfur was 30 pounds per 1,000 barrels of furnace oil.

Having described my invention, I claim:

1. In the method of removing undesirable sulfur compounds from a petroleum distillate which comprises incorporating in the distillate elemental sulfur, sufficient alkaline compound to maintain the distillate alkaline, disperesed water and dispersed oxygen, and contacting the resulting alkaline distillate with a catalyst composed of lead sulfide on a solid inert carrier the improvement which comprises adding to the petroleum distillate charged an amount of lead oxide which is sufficient to supply lead values to the catalyst and which does not exceed the amount which is soluble in the charged mixture.

2. The method of claim 1 in which the lead oxide is added in an aqueous caustic solution to the petroleum distillate.

3. The method of claim 2 in which the amount of lead oxide added is about 2 to 10 pounds per 6,000 barrels of petroleum distillate charged.

References Cited in the file of this patent

UNITED STATES PATENTS

| | | |
|---|---|---|
| 1,777,619 | Low | Oct. 7, 1930 |
| 2,208,591 | Lyder | July 30, 1940 |
| 2,376,223 | Bender | May 15, 1945 |